US010397949B2

(12) United States Patent
Jiang et al.

(10) Patent No.: US 10,397,949 B2
(45) Date of Patent: Aug. 27, 2019

(54) PUCCH RESOURCE CONFIGURATION METHOD IN CARRIER AGGREGATION AND EQUIPMENTS THEREOF

(71) Applicant: SHARP KABUSHIKI KAISHA, Sakai, Osaka (JP)

(72) Inventors: Qi Jiang, Shanghai (CN); Renmao Liu, Shanghai (CN)

(73) Assignee: SHARP KABUSHIKI KAISHA, Sakai, Osaka (JP)

(*) Notice: Subject to any disclaimer, the term of this patent is extended or adjusted under 35 U.S.C. 154(b) by 0 days.

(21) Appl. No.: 15/565,487

(22) PCT Filed: Apr. 8, 2016

(86) PCT No.: PCT/CN2016/078879
§ 371 (c)(1),
(2) Date: Oct. 10, 2017

(87) PCT Pub. No.: WO2016/161977
PCT Pub. Date: Oct. 13, 2016

(65) Prior Publication Data
US 2018/0084573 A1   Mar. 22, 2018

(30) Foreign Application Priority Data

Apr. 10, 2015   (CN) .......................... 2015 1 0169353

(51) Int. Cl.
*H04W 72/14* (2009.01)
*H04L 5/00* (2006.01)
*H04W 72/04* (2009.01)

(52) U.S. Cl.
CPC ............. *H04W 72/14* (2013.01); *H04L 5/001* (2013.01); *H04L 5/0053* (2013.01);
(Continued)

(58) Field of Classification Search
CPC ........ H04W 72/14; H04L 5/00; H04L 5/0053; H04B 7/0413
See application file for complete search history.

(56) References Cited

U.S. PATENT DOCUMENTS

2012/0046032 A1* 2/2012 Baldemair ............ H04L 5/0053
455/434
2013/0078913 A1* 3/2013 Lee ....................... H04L 5/0007
455/39
(Continued)

FOREIGN PATENT DOCUMENTS

CN       101778449 A     7/2010
CN       102036387 A     4/2011

OTHER PUBLICATIONS

Source: Nokia Corporation, NTT DoCoMo Inc., Nokia Networks; Title: New WI proposal: LTE Carrier Aggregation Enhancement Beyond 5 Carriers; Document for: Decision; Agenda Item: 14.1.1; RP-142286; 3GPP TSG RAN Meeting #66; Maui, Hawaii (US), Dec. 8-11, 2014.

(Continued)

*Primary Examiner* — Mohammad S Anwar
(74) *Attorney, Agent, or Firm* — ScienBiziP, P.C.

(57) ABSTRACT

Provided are a PUCCH resource configuration method in carrier aggregation and equipment thereof. According to one implementation, provided is a Physical Uplink Control Channel (PUCCH) resource configuration method executed by a base station, including: configuring PUCCH resources comprising a first parameter and a second parameter for a first antenna port, wherein the first parameter indicates PUCCH resource values allocated to the first antenna port, and the second parameter indicates the number of continuous PRBs for PUCCH resources which are allocated to the first antenna port; and sending the PUCCH resource configuration to user equipment.

8 Claims, 2 Drawing Sheets

(52) U.S. Cl.
CPC .......... *H04L 5/0064* (2013.01); *H04L 5/0012* (2013.01); *H04L 5/0039* (2013.01); *H04L 5/0055* (2013.01); *H04W 72/0413* (2013.01)

(56) References Cited

U.S. PATENT DOCUMENTS

2013/0188566 A1*   7/2013   Zhu ..................... H04W 72/042
                                                              370/329
2014/0105155 A1*   4/2014   Kim ..................... H04L 1/1861
                                                              370/329

OTHER PUBLICATIONS

Source: CATT; Title: HARQ-ACK transmission on PUCCH for Rel-13 CA; Agenda Item: 7.2.2.2.3; Document for: Discussion and Decision; R1-150105; 3GPP TSG RAN WG1 Meeting #80 ; Athens, Greece, Feb. 9-13, 2015.

Source: Samsung; Title:HARQ-ACK Transmission for Enhanced CA; Document for: Discussion and Decision; R1-150360; 3GPP TSG RAN WG1 #80 Athens, Greece, Feb. 9-13, 2015.

3rd Generation Partnership Project; Technical Specification Group Radio Access Network; Evolved Universal Terrestrial Radio Access (E-UTRA); Physical layer procedures (Release 12); 3GPP TS 36.213 V12.5.0 (Mar. 2015).

3rd Generation Partnership Project;Technical Specification Group Radio Access Network; Evolved Universal Terrestrial Radio Access (E-UTRA); Physical channels and modulation (Release 12); 3GPP TS 36.211 V125.0 (Mar. 2015).

3rd Generation Partnership Project; Technical Specification Group Radio Access Network; Evolved Universal Terrestrial Radio Access (E-UTRA); Radio Resource Control (RRC); Protocol specification (Release 12); 3GPP TS 36331 V125.0 (Mar. 2015).

* cited by examiner

PUCCH RESOURCE CONFIGURATION METHOD IN CARRIER AGGREGATION AND EQUIPMENTS THEREOF

TECHNICAL FIELD

The present invention relates to the technical field of wireless communication. More specifically, the present invention relates to a resource configuration method for communication between an equipment, a base station and user equipment.

BACKGROUND

Modern wireless mobile communication systems present two significant characteristics: first, a high-speed broadband, for example, the bandwidth of the Fourth Generation wireless mobile communication system can reach 100 MHz and a downlink speed of up to 1 Gbps; and second, mobile interconnection is adopted, thereby promoting emerging services such as mobile internet access, mobile phone video-on-demand, online navigation and the like. These two characteristics propose relatively high requirements for a wireless mobile communication technology. Such requirements mainly include: ultrahigh speed wireless transmission, inter-region interference suppression, mobile reliable signal transmission, distributed/centralized signal processing and the like. To satisfy the development requirements above, in a future, more enhanced Fourth Generation (4G) or Fifth Generation (5G) wireless mobile communication system, various corresponding key technologies will begin to be proposed and demonstrated, arousing the attention of researchers in the field.

In October 2007, the International Telecommunication Union (ITU) approved the Worldwide Interoperability for Microwave Access (WiMax) system to become the fourth 3G system standard. In order to respond to the challenge of wireless IP technical flow represented by a wireless local area network and WiMax, since 2005, the Third Generation Partnership Project (3GPP) organization has started to carry out brand-new system upgrade, i.e., standardization of a Long Term Evolution (LTE) system. It is a quasi fourth generation system based on an Orthogonal Frequency Division Multiplexing (OFDM) technology, the first edition of the quasi fourth generation system was released early in 2009, and the quasi 4G system began to be commercially available in succession all over the world in 2010. Meanwhile, the 3GPP organization started standardization customization of the Fourth Generation (4G) wireless mobile communication system the first half of 2008. This system is called a Long Term Evolution Advanced (LTE-A) system. The key standardization document of the physical layer process of the system was completed early in 2011. In November 2011, the ITU organization officially announced, in Chongqing China, that the LTE-A system and the WiMax system were two official standards of the 4G system. At present, the commercial process of the LTE-A system is being developed gradually worldwide.

According to the challenges in the next 10 years, the following development requirements are substantially provided for an enhanced 4G wireless mobile communication system.

A higher wireless broadband speed is required, and optimization of local cell hot spot regions is emphasized.

The user experience is further improved, particularly it is necessary to optimize communication services of cell boundary regions.

In view of it being impossible to expand clear bands spectra 1000 times, it is necessary to continue researching a new technology capable of improving spectrum band utilization efficiency.

High-frequency bands spectra (5 GHz or greater) will certainly come into use to obtain a larger communication bandwidth.

Existing networks (2G/3G/4G, WLAN, WiMax, etc.) cooperate to share data traffic.

Different services, applications and service are specifically optimized.

A system capability of supporting large-scale machine communications is supported.

Network planning and distribution are flexible, smart and inexpensive.

A solution is designed to save the power consumption of a network and the battery consumption of user equipment.

At present, in the traditional 3GPP LTE system, whether the uplink transmission or downlink transmission can support, at most, the aggregation of 5 Component Carriers (CCs), and if each component carrier is up to 20 MHz, the user equipment can simultaneously support, at most, the uplink and downlink transmission of 100 MHz. With the growing demand of data traffic, it has been difficult to meet the future need of 100 MHz transmission bandwidth. A new research subject, i.e. research of LTE carrier aggregation enhancement beyond 5 carriers (RP-142286) was discussed at the 66th 3GPP RAN Conference, which mainly aimed at researching aggregation technology supporting up to 32 component carriers (CC) during uplink and downlink so as to increase the transmission speed.

For this purpose, a key problem exists in the system design, i.e., how the user equipment feeds back Hybrid Automatic Retransmission Request (HARQ) information transmitted by downlink data in an uplink channel. At present, the user equipment in the system, in a carrier aggregation scene, adopts a Physical Uplink Control Channel (PUCCH) format 3 to transmit Hybrid Automatic Retransmission Request (HARQ) feedback corresponding to Physical Downlink Shared Channel (PDSCH) transmission on 8 carrier components at most, and one transmission using the PUCCH format 3 needs to occupy two uplink Physical Resource Blocks (PRBs). However, according to requirements of a current Rel-13 CA, the PUCCH format 3 cannot simultaneously transmit HARQ feedback information of 32 downlink CCs.

SUMMARY

In order to solve a current problem of a small Physical Uplink Control Channel (PUCCH) transmission load, the present invention discloses a PUCCH resource configuration method executed by a base station, including:

configuring PUCCH resources for a first antenna port; and
sending the PUCCH resource configuration to user equipment, wherein the PUCCH resource configuration includes a starting position of continuous Physical Resource Blocks (PRBs) for PUCCH resources which are allocated to the first antenna port, and the number of the continuous Physical Resource Blocks (PRBs) for the PUCCH resources which are allocated to the first antenna port, or the PUCCH resource configuration includes a starting position of the continuous PRBs for the PUCCH resources which are allocated to the first antenna port, and a spectrum spreading code indication for performing spectrum spreading on the physical resource blocks allocated to the first antenna port.

The present invention further provides a PUCCH resource configuration method executed by a base station, including: configuring PUCCH resources for a first antenna port, wherein the PUCCH resource configuration includes: the starting position of continuous Physical Resource Blocks (PRBs) for PUCCH resources which are allocated to the first antenna port, and the number of the continuous Physical Resource Blocks (PRBs) for the PUCCH resources which are allocated to the first antenna port: or the starting position of the continuous PRBs for the PUCCH resources which are allocated to the first antenna port, and a spectrum spreading code indication for performing spectrum spreading on the physical resource blocks allocated to the first antenna port.

The invention further correspondingly provides a base station equipment, including:
a scheduling device, used for configuring Physical Uplink Control Channel (PUCCH) resources for a first antenna port; and
a sending device, used for sending the PUCCH resource configuration to user equipment,
wherein the PUCCH resource configuration includes the starting position of continuous Physical Uplink Control Channel (PRBs) for PUCCH resources which are allocated to the first antenna port, and the number of the continuous PRBs for the PUCCH resources which are allocated to the first antenna port, or
the PUCCH resource configuration includes the starting position of the continuous PRBs for the PUCCH resources which are allocated to the first antenna port, and a spectrum spreading code indication for performing spectrum spreading on the physical resource blocks allocated to the first antenna port.

At a corresponding user equipment side, the present invention further provides a method, including:
receiving a Physical Uplink Control Channel (PUCCH) resource configuration for a first antenna port from a base station;
according to the PUCCH resource configuration, decoding data sent by the base station by using a corresponding PUCCH format,
wherein the PUCCH resource configuration includes the starting position of continuous Physical Resource Blocks (PRBs) for PUCCH resources which are allocated to the first antenna port, and the number of the continuous Physical Resource Blocks (PRBs) for the PUCCH resources which are allocated to the first antenna port, or
the PUCCH resource configuration comprises the starting position of the continuous PRBs for the PUCCH resources which are allocated to the first antenna port, and a spectrum spreading code indication for performing spectrum spreading on the physical resource blocks allocated to the first antenna port.

The present invention further correspondingly provides user equipment, including:
a receiving device, used for receiving a Physical Uplink Control Channel (PUCCH) resource configuration for a first antenna port from a base station; and
a decoding device, used for decoding data sent by the base station by using a corresponding PUCCH format according to the PUCCH resource configuration,
wherein the PUCCH resource configuration includes the starting position of continuous Physical Resource Blocks (PRBs) for PUCCH resources which are allocated to the first antenna port, and the number of the continuous PRBs for the PUCCH resources which are allocated to the first antenna port, or
the PUCCH resource configuration includes the starting position of the continuous PRBs for the PUCCH resources which are allocated to the first antenna port, and a spectrum spreading code indication for performing spectrum spreading on the physical resource blocks allocated to the first antenna port.

According to the above PUCCH resource configuration method of the present invention, a new PUCCH format 3a is transmitted via a plurality of continuous PRBs, information of Hybrid Automatic Retransmission Request (HARQ) feedback of 32 Component Carriers (CCs) at most can be contained, and the current problem of the small PUCCH transmission load is solved.

DESCRIPTION OF THE DRAWINGS

The drawings, which are incorporated into the present description and constitute a part of the present description, are illustrated together with descriptions and are used for explaining various embodiments.

From detailed descriptions in conjunction with the drawings below, the above-mentioned and other features of the present invention will become more obvious, wherein.

DESCRIPTION OF THE EMBODIMENTS

Specific implementation modes of the present invention will be described below in conjunction with the drawings and specific embodiments.

Note that the present invention should not be limited to the specific embodiments described below. In addition, for the sake of simplicity, detailed descriptions on widely-known technologies, which have no direct association with the present invention, are omitted so as to prevent causing confusion of the understanding of the present invention.

A plurality of embodiments according to the present invention are particularly described below by using a Long Term Evolution (LTE) mobile communication system and a subsequent evolution version (LTE-A, Long Term Evolution Advanced) thereof as exemplary application environments. However, it should be noted that although descriptions are made mainly with respect to LTE and LTE-A networks in the present invention, the present invention may also be applied to other networks existing or developed in the future, as long as the networks have a problem of a small Physical Uplink Control Channel (PUCCH) (or similar channel) transmission load. e.g., a Fifth Generation (5G) cellular communication system in the future.

Figure 1:
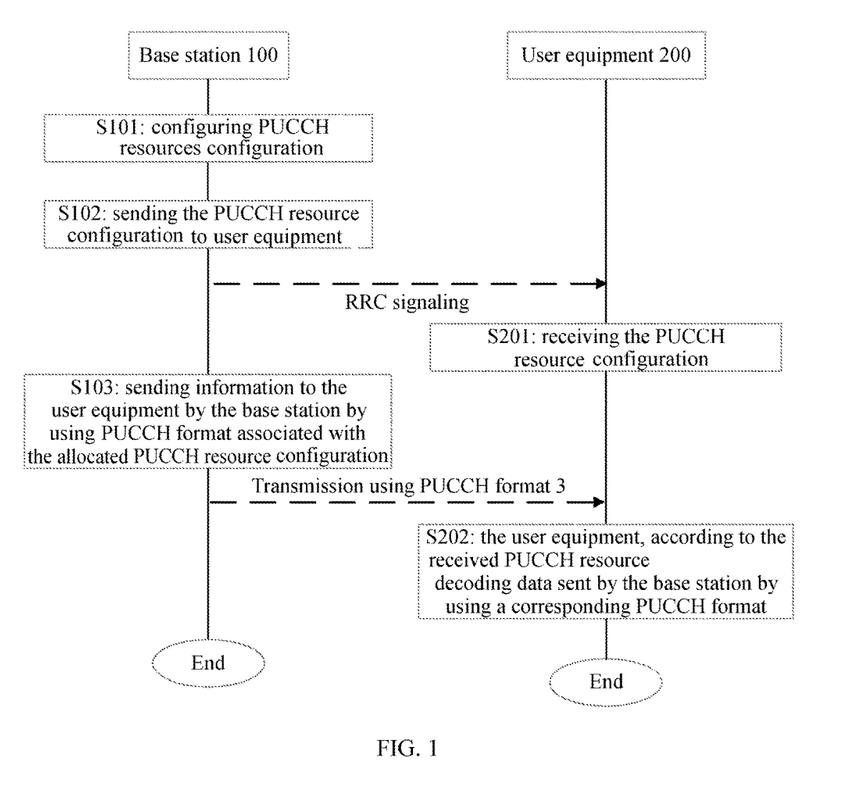
FIG. 1 is a flow diagram illustrating configuration of a base station and processing of user equipment according to one embodiment of the present invention.

FIG. 1 is a flow diagram illustrating configuration of a base station and processing of user equipment according to an embodiment of the present invention. As illustrated in FIG. 1, firstly, operations on a base station side will be described.

S101: a base station configures PUCCH resources for a first antenna port to user equipment. Particularly, the PUCCH resource configuration for the first antenna port includes the starting position of continuous Physical Resource Blocks (PRBs) for PUCCH resources which are allocated to the first antenna port, and the number of the continuous PRBs for the PUCCH resources which are allocated to the first antenna port, or includes the starting position of the continuous PRBs for the PUCCH resources which are allocated to the first antenna port, and a spectrum spreading code indication for performing spectrum spreading on the physical resource blocks allocated to the first antenna port.

In some examples, when a detected Physical Downlink Control Channel (PDCCH)/Enhanced Physical Downlink Control Channel (EPDCCH) indicates Physical Downlink Shared Channel (PDSCH) transmission in a secondary cell corresponding to an non-anchor carrier, i.e., when cross-carrier scheduling is carried out by utilizing the secondary cell, a PUCCH format (in the present invention, in order to distinguish the PUCCH format from an existing PUCCH format 3, the PUCCH format is named as a PUCCH format 3a) and PUCCH resource parameters, which are proposed by the present invention, can be used. In this text, the PUCCH resource parameters may include the starting position of the continuous PRBs for the PUCCH resources and the number of the continuous PRBs for the PUCCH resources, i.e., the above-mentioned PUCCH resource configuration. Or, in some other examples, the PUCCH resource parameters may include the starting position of the continuous PRBs for the PUCCH resources which are allocated to the first antenna port, and the spectrum spreading code indication for performing spectrum spreading on the physical resource blocks allocated to the first antenna port. Herein, a PUCCH-Config information unit may be used for setting the PUCCH resource parameters, and a Transmission Power Control (TPC) field in a Downlink Control Information (DCI) format in the corresponding PDCCH/EPDCCH is used for indicating which parameter in a plurality of PUCCH resource parameters allocated by the PUCCH-Config information unit is adopted, so that a certain scheduling gain can be obtained. Herein, the PUCCH-Config information unit may be a PUCCH-ConfigDedicated information unit discussed in 3GPP TS 36.331, and particularly, may be a PhysicalConfigDedicated information unit.

The PUCCH resource parameters are discussed below by taking the first antenna port as an example. For the sake of simplicity, the PUCCH resource parameters are respectively named as a first parameter and a second parameter, but the names are not intended to limit the PUCCH resource parameters.

The first parameter indicates a group of PUCCH resource values allocated to the first antenna port, the group of PUCCH resource values corresponding to a plurality of PUCCH resources allocated by the PUCCH-Config information unit. Herein, the PUCCH resource values are used for indicating PRB indexes and/or an orthogonal sequence, and the PRB indexes indicate the starting position used for transmitting the PRB resources of the PUCCH.

As an example, a first parameter value may be one of a group of positive integers $n_{PUCCH}^{3a,p}$ between 0 and 549, where a sign p in superscripts indicates an antenna port number and a value of the sign p herein is 0. 3a indicates that the parameter is used for the PUCCH format 3a. The starting position for transmitting the PRB resources of the PUCCH are $m_{start} = \lfloor n_{PUCCH}^{3a,p} / N_{SF,0}^{PUCCH} \rfloor$, where $N_{SF,0}^{PUCCH}$ represents the number of PUCCH resources included in one PRB pair in a case where a Sounding Reference Signal (SRB) is not allocated. $N_{SF,0}^{PUCCH}$ may be a fixed value, and the value of $N_{SF,0}^{PUCCH}$ is equal to 5 in one example. Then orthogonal sequence indexes can be determined by the following equations:

$$n_{oc,0}^{(p)} = n_{PUCCH}^{3a,p} \bmod N_{SF,1}^{PUCCH}$$

$$n_{oc,1}^{(p)} = \begin{cases} (3n_{PUCCH}^{3a,p}) \bmod N_{SF,1}^{PUCCH}, & \text{if } N_{SF,1}^{PUCCH} = 5 \\ (n_{PUCCH}^{3a,p}) \bmod N_{SF,1}^{PUCCH}, & \text{others} \end{cases}$$

Herein, $n_{oc,0}^{(p)}$ is an orthogonal sequence index on a first slot of a corresponding sub-frame when a corresponding PUCCH format is transmitted. $n_{oc,1}^{(p)}$ is an orthogonal sequence index on a second slot of the corresponding sub-frame when the corresponding PUCCH format is transmitted. $N_{SF,1}^{PUCCH}$ represents the number of PUCCH resources included by one PRB pair used for sending the PUCCH. If the SRS is not sent, the value is 5; and if the SRS is sent, the value is 4.

In some examples, if the PUCCH format is applied in the above first slot and the above second slot satisfies inter-slot frequency hopping requirements in current protocols (e.g., an LTE protocol and an LTE-A protocol), the PUCCH format 3a is also applied in the second slot.

A specific relationship between the orthogonal sequence indexes and the orthogonal sequence can refer to Table 5.4.2A-1 in 3GPP TS26.211 as follow.

TABLE 5.4.2A-1

| | Orthogonal Sequence $w_{n_{oc}}$ (i) | |
|---|---|---|
| Sequence index $n_{oc}$ | Orthogonal Sequence $[w_{n_{oc}}(0) \ldots w_{n_{oc}}(N_{SF}^{PUCCH} - 1)]$ | |
| | $N_{SF}^{PUCCH} = 5$ | $N_{SF}^{PUCCH} = 4$ |
| 0 | [1 1 1 1 1] | [+1 +1 +1 +1] |
| 1 | [1 $e^{j2\pi/5}$ $e^{j4\pi/5}$ $e^{j6\pi/5}$ $e^{j8\pi/5}$] | [+1 −1 +1 −1] |
| 2 | [1 $e^{j4\pi/5}$ $e^{j8\pi/5}$ $e^{j2\pi/5}$ $e^{j6\pi/5}$] | [+1 +1 −1 −1] |
| 3 | [1 $e^{j6\pi/5}$ $e^{j2\pi/5}$ $e^{j8\pi/5}$ $e^{j4\pi/5}$] | [+1 −1 −1 +1] |
| 4 | [1 $e^{j8\pi/5}$ $e^{j6\pi/5}$ $e^{j4\pi/5}$ $e^{j2\pi/5}$] | — |

Note that $N_{SF}^{PUCCH}$ in the table above may be either $N_{SF,0}^{PUCCH}$ or $N_{SF,1}^{PUCCH}$ in the present invention.

The second parameter indicates a group of values for the number of the continuous PRBs for the PUCCH resources which are allocated to the first antenna port, and the group of values is used for indicating the number of the continuous PRBs for transmitting corresponding PUCCH resources. The number of the group of values is the same as the number of the PUCCH resource values in the first parameter.

As one embodiment, a second parameter value is a positive integer K between 1 and 8, i.e., it is represented by $m_{start} = \lfloor n_{PUCCH}^{3a,p} / N_{SF,0}^{PUCCH} \rfloor$, K continuous PRBs will be allocated to the PUCCH for transmission. Specific positions of the PRBs in two slots can refer to the following equation:

$$n_{PRB} = \begin{cases} \left\lfloor \frac{m_{start}}{2} \right\rfloor, \left\lfloor \frac{m_{start}}{2} \right\rfloor + \\ 1, \ldots \left\lfloor \frac{m_{start}}{2} \right\rfloor + K - 1, & \text{if } (m_{start} + n_s \bmod 2) \bmod 2 = 0 \\ N_{RB}^{UL} - 1 - \left\lfloor \frac{m_{start}}{2} \right\rfloor, N_{RB}^{UL} - 2 - \\ \left\lfloor \frac{m_{start}}{2} \right\rfloor, N_{RB}^{UL} - K + 1 - \left\lfloor \frac{m_{start}}{2} \right\rfloor, & \text{if } (m_{start} + n_s \bmod 2) \bmod 2 = 1 \end{cases}$$

Herein $n_s$ is a slot label in a wireless frame, and is an integer from 0 to 19.

$N_{RB}^{UL}$ is the number of resource blocks of an uplink frequency band.

Particularly, if the combination number of the number of continuous PRBs corresponding to the PUCCH resource values allocated in the PUCCH-Config information unit and the number of continuous PRBs corresponding to the respective PUCCH resource values is greater than 4, i.e., more than four groups of values of $n_{PUCCH}^{3a,p}$ and K are allocated. Then the TPC field in the DCI format corresponding to the PDCCH/EPDCCH can be expanded.

Particularly, in a first exemplary configuration, if six groups of values of $n_{PUCCH}^{3a,p}$ and K are allocated, the TPC field is expanded into 3 bits, 000 indicates a first group of values of $n_{PUCCH}^{3a,p}$ and K as allocated resources for PUCCH transmission;
001 indicates a second group of values of $n_{PUCCH}^{3a,p}$ and K as allocated resources for PUCCH transmission;
010 indicates a third group of values of $n_{PUCCH}^{3a,p}$ and K as allocated resources for PUCCH transmission;
011 indicates a fourth group of values of $n_{PUCCH}^{3a,p}$ and K as allocated resources for PUCCH transmission;
100 indicates a fifth group of values of $n_{PUCCH}^{3a,p}$ and K as allocated resources for PUCCH transmission;
101 indicates a sixth group of values of $n_{PUCCH}^{3a,p}$ and K as allocated resources for PUCCH transmission;
110 and 111 are for later use.

Particularly, in a second exemplary configuration, if 8 groups of values of $n_{PUCCH}^{3a,p}$ and K are allocated, the TPC field is expanded into 3 bits, 000 indicates a first group of values of $n_{PUCCH}^{3a,p}$ and K as allocated resources for PUCCH transmission;
001 indicates a second group of values of $n_{PUCCH}^{3a,p}$ and K as allocated resources for PUCCH transmission;
010 indicates a third group of values of $n_{PUCCH}^{3a,p}$ and K as allocated resources for PUCCH transmission;
011 indicates a fourth group of values of $n_{PUCCH}^{3a,p}$ and K as allocated resources for PUCCH transmission;
100 indicates a fifth group of values of $n_{PUCCH}^{3a,p}$ and K as allocated resources for PUCCH transmission;
101 indicates a sixth group of values of $n_{PUCCH}^{3a,p}$ and K as allocated resources for PUCCH transmission;
110 indicates a seventh group of values of $n_{PUCCH}^{3a,p}$ and K as allocated resources for PUCCH transmission;
111 indicates an eighth group of values of $n_{PUCCH}^{3a,p}$ and K as allocated resources for PUCCH transmission.

Note that where more/fewer combinations are used, expansion of the TPC field may also be correspondingly changed, i.e., the TPC field may also be expanded into more than or fewer than 3 bits.

Note that in some other examples, the above $n_{oc,0}^{(p)}$ and $n_{oc,1}^{(p)}$ may also be used as examples of the second parameters, i.e., the first parameter may indicate the starting position (e.g., the PRB indexes of the PRBs) of the continuous PRBs for the PUCCH resources which are allocated to the first antenna port, and the second parameter may indicate the spectrum spreading code indication for performing spectrum spreading on the physical resource blocks allocated to the first antenna port. Allocation for the first parameter and the second parameter in the example is similar to allocation for the first parameter and the second parameter in the example above, therefore it is not repeatedly described herein.

Moreover, optionally, the PUCCH resource configuration sent to the user equipment may include allocation parameters (which are similar to those for the first antenna port, and in order to facilitate description, can be named as a third parameter and a fourth parameter) for a second antenna port, and similar to the first parameter and the second parameter, the third parameter indicates the starting position of continuous PRBs for PUCCH resources which are allocated to the second antenna port, and the fourth parameter indicates the number of the continuous PRBs for the PUCCH resources which are allocated to the second antenna port. In some other examples, similar to the first parameter and the second parameter, the third parameter may indicate the starting position (e.g., PRB indexes of the PRBs) of the continuous PRBs for the PUCCH resources which are allocated to the second antenna port, and the fourth parameter may indicate a spectrum spreading code indication for performing spectrum spreading on the physical resource blocks allocated to the second antenna port. Allocation of the third parameter and the fourth parameter for the second antenna port is similar to that of the first parameter and the second parameter for the first antenna port, therefore it is not repeatedly described herein.

In a case where the sent PUCCH resource configuration includes the third parameter and the fourth parameter for the second antenna port, the TPC field indicates combinations of $n_{PUCCH}^{3a,p}$ and K for the first antenna port and the second antenna port respectively, and is expanded according to the total number of the indicated combinations. Particularly, based on the above-mentioned TPC field expansion for the first antenna port, bits for the second antenna port are increased. In such a case, spare bit combinations in the above first exemplary allocation may or may not be used.

S102: the PUCCH resource configuration for the first antenna port is sent to the user equipment by the base station. In some embodiments, the sending is carried out by Radio Resource Control (RRC) signaling.

Optionally, in some cases, the sent PUCCH resource configuration may further include resource parameters for the second antenna port.

S103: information is sent to the user equipment by the base station by using a PUCCH format associated with the PUCCH resource configuration. Particularly, the base station, according to the PUCCH format 3a associated with the PUCCH resource configuration, carries out coding on information which is to be decoded and transmitted on specific resources according to the PUCCH format 3a.

The PUCCH format 3a of the present invention occupies a plurality of continuous PRBs in one slot of a frequency domain. In some examples, if the PUCCH format is applied in the first slot and the second slot satisfies the inter-slot frequency hopping requirements in the current protocols, the PUCCH format 3a is also applied in the second slot.

Operations at user equipment side will be described below with reference to FIG. 1.

S201: the user equipment receives the PUCCH resource configuration for the first antenna port from the base station. Particularly, the PUCCH resource configuration for the first antenna port includes the first parameter and the second parameter, the first parameter indicates the starting position of the continuous PRBs for the PUCCH resources which are allocated to the first antenna port, and the second parameter indicates the number of the continuous PRBs for the PUCCH resources which are allocated to the first antenna port. Or, in some other examples, the first parameter may indicate the starting position (e.g., the PRB indexes of the PRBs) of the continuous PRBs for the PUCCH resources which are allocated to the first antenna port, and the second parameter may indicate the spectrum spreading code indication for performing spectrum spreading on the physical resource blocks allocated to the first antenna port.

In some embodiments, optionally, the received PUCCH resource configuration may further include the third parameter and the fourth parameter, the third parameter indicates the starting position of the continuous PRBs for the PUCCH resources which are allocated to the second antenna port, and the fourth parameter indicates the number of the continuous PRBs for the PUCCH resources which are allocated to the second antenna port. Or, in some other examples, similarly to the first parameter and the second parameter, the third parameter may indicate the starting position (e.g., PRB indexes of the PRBs) of the continuous PRBs for the PUCCH resources which are allocated to the second antenna port, and the fourth parameter may indicate a spectrum spreading code indication for performing spectrum spreading on the physical resource blocks allocated to the second antenna port.

As described above, in some embodiments, the received PUCCH resource configuration is sent by the base station through RRC signaling. The PUCCH resource values (e.g., the starting position of the continuous PRBs) herein are determined by the PUCCH-Config information unit, and the TPC field in the DCI format corresponding to the PDCCH/EPDCCH is used for indicating which value in a plurality of PUCCH resource values allocated by the PUCCH-Config information unit is adopted.

S202: the user equipment, according to the received PUCCH resource configuration, decodes data sent by the base station by using a corresponding PUCCH format. Particularly, the user equipment can, according to the received PUCCH resource configuration including the first parameter and the second parameter for the first antenna port and optionally including the third parameter and the fourth parameter for the second antenna port, decode information transmitted in the PUCCH format 3a on specific resources.

Figure 2:
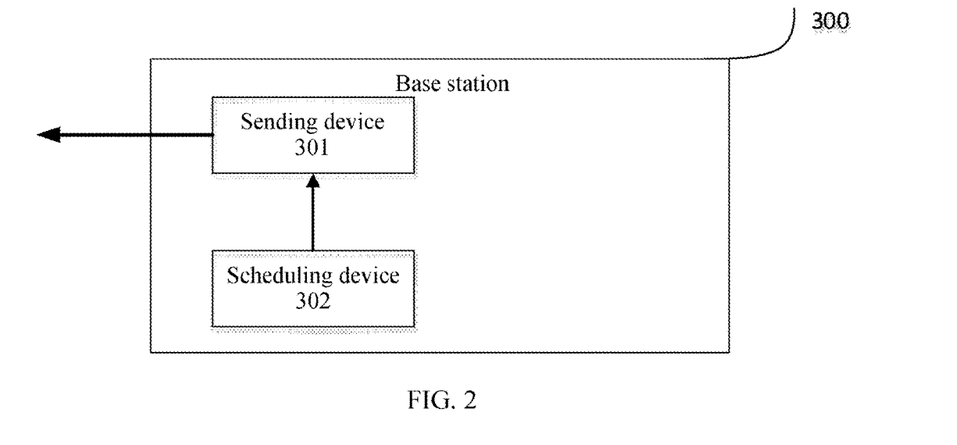
FIG. 2 is a structural block diagram illustrating a processing device used in a base station according to one embodiment of the present invention.

FIG. 2 is a structural block diagram illustrating a processing device in a base station. As illustrated in FIG. 2, a base station device 300 includes a sending device 301 and a scheduling device 302. The scheduling device is used for allocating the PUCCH resource configuration including the first parameter and the second parameter for the first antenna port, wherein the first parameter indicates the starting position of the continuous PRBs for the PUCCH resources which are allocated to the first antenna port, and the second parameter indicates the number of the continuous PRBs for the PUCCH resources which are allocated to the first antenna port. Or, in some other examples, the first parameter may indicate the starting position (e.g., the PRB indexes of the PRBs) of the continuous PRBs for the PUCCH resources which are allocated to the first antenna port, and the second parameter may indicate a spectrum spreading code indication for performing spectrum spreading on the physical resource blocks allocated to the first antenna port. In some embodiments, optionally, the sent PUCCH resource configuration may further include the third parameter and the fourth parameter for the second antenna port, wherein the third parameter indicates the starting position of the continuous PRBs for the PUCCH resources which are allocated to the second antenna port, and the fourth parameter indicates the number of the continuous PRBs for the PUCCH resources which are allocated to the second antenna port. The sending device is used for sending the PUCCH resource configuration for the first antenna port and/or the second antenna port to the user equipment. Or, in some other examples, similar to the first parameter and the second parameter, the third parameter may indicate the starting position (e.g., the PRB indexes of the PRBs) of the continuous PRBs for the PUCCH resources which are allocated to the second antenna port, and the fourth parameter may indicate the spectrum spreading code indication for performing spectrum spreading on the physical resource blocks allocated to the second antenna port.

As described above, in some embodiment, the PUCCH resource configuration is sent by the base station through RRC signaling. The PUCCH resource values (e.g., the starting position of the continuous PRBs) herein are determined by the PUCCH-Config information unit, and the TPC field in the DCI format corresponding to the PDCCH/EPDCCH is used for indicating which value in a plurality of PUCCH resource values allocated by the PUCCH-Config information unit is adopted.

Figure 3:
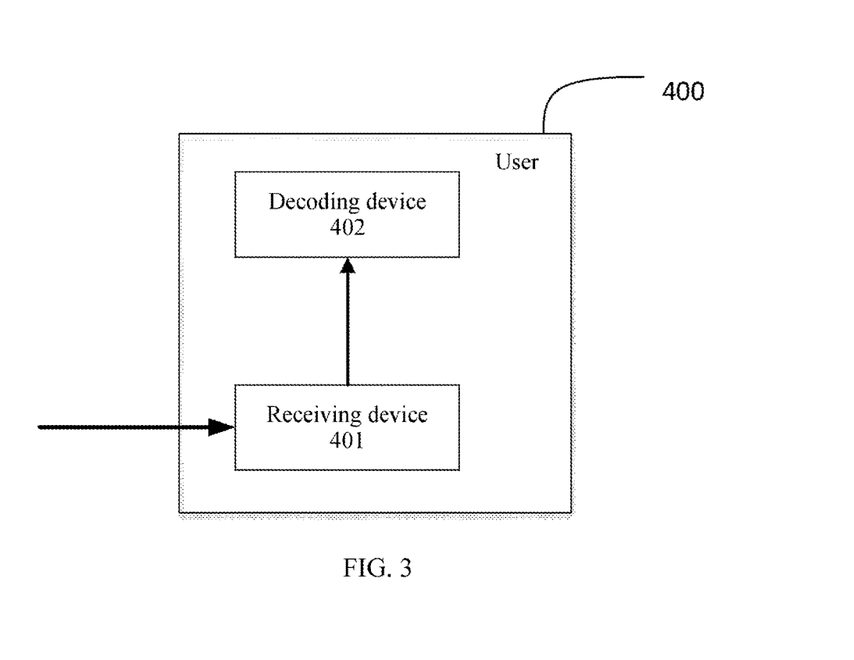
FIG. 3 is a structural block diagram illustrating a processing device used in User Equipment (UE) according to one embodiment of the present invention.

FIG. 3 is a structural block diagram illustrating a processing device in User Equipment (UE). As illustrated in FIG. 3, a UE device 400 includes a receiving device 401 and a decoding device 402. The receiving device 401 is used for receiving the PUCCH resource configuration for the first antenna port from the base station, wherein the PUCCH resource configuration for the first antenna port may include the first parameter and the second parameter, the first parameter indicates the starting position of the continuous PRBs for PUCCH resources which are allocated to the first antenna port, and the second parameter indicates the number of the continuous Physical Resource Blocks (PRBs) for the PUCCH resources which are allocated to the first antenna port. In some other examples, the first parameter may indicate the starting position (e.g., the PRB indexes of the PRBs) of the continuous PRBs for the PUCCH resources which are allocated to the first antenna port, and the second parameter may indicate the spectrum spreading code indication for performing spectrum spreading on the physical resource blocks allocated to the first antenna port. In some embodiments, optionally, the received PUCCH resource configuration further includes the third parameter and the fourth parameter for the second antenna port, the third parameter indicates the starting position of the continuous PRBs for the PUCCH resources which are allocated to the second antenna port, and the fourth parameter indicates the number of the continuous PRBs for the PUCCH resources which are allocated to the second antenna port. The decoding device 402 is used for decoding data sent by the base station by using a corresponding PUCCH format according to the received PUCCH resource configuration. Or, in some other examples, similar to the first parameter and the second parameter, the third parameter may indicate the starting position (e.g., the PRB indexes of the PRBs) of the continuous PRBs for the PUCCH resources which are allocated to the second antenna port, and the fourth parameter may indicate the spectrum spreading code indication for performing spectrum spreading on the physical resource blocks allocated to the second antenna port.

As described above, in some embodiment, the received PUCCH resource configuration is sent by the base station through RRC signaling. The PUCCH resource values (e.g., the starting position of the continuous PRBs) herein are determined by the PUCCH-Config information unit, and the TPC field in the DCI format corresponding to the PDCCH/EPDCCH is used for indicating which value in a plurality of PUCCH resource values allocated by the PUCCH-Config information unit is adopted.

Particularly, the decoding device 402, according to the received RRC signaling including the first parameter and the second parameter for the first antenna port and/or the third parameter and the fourth parameter for the second antenna port, decodes information transmitted by using the PUCCH format 3a on specific resources.

In order to explain the technical essence of the present invention more clearly, the equipment block diagrams illustrated in FIG. 3 and FIG. 4 only include structures most related to the explanation of the technical solution of the present invention. However, it should be understood that an actual equipment may further include more structures/parts, e.g., a memory for storing information required by structures illustrated in the drawings and/or generated information, a display (a touch type display or a non-touch type display) for displaying information to a user, an antenna, a specific radio frequency and baseband processing circuit, an input device (such as a mouse, a microphone and the like) and an output device (such as a loudspeaker and the like) for an equipment, and the like. According to the disclosure of the present invention, those skilled in the art can combine the above-described technical solution with these devices/equipments to particularly implement the technical solution of the present invention, therefore it is not repeatedly described herein.

It should be understood that the embodiments above of the present invention can be implemented by software, hardware or a combination of the software and the hardware. For example, various components inside the base station and the user equipment in the embodiments above can be implemented by various devices, and these devices include, but are not limited to: an analog circuit device, a digital circuit device, a Digital Signal Processor (DSP) circuit, a programmable processor, an Application Specific Integrated Circuit (ASIC), a Field Programmable Gate Array (FPGA), a Complex Programmable Logic Device (CPLD) and the like.

In the present application, the term "base station" refers to a mobile communication data and control switching center with a larger transmit power and a wider coverage area, and has functions of resource distribution scheduling, data receiving and sending and the like. The term "user equipment" refers to a user mobile terminal, e.g., a terminal equipment capable of performing wireless communication with the base station or a micro base station, including a mobile phone, a notebook computer and the like.

Moreover, the embodiments of the present invention disclosed herein can be implemented on a computer program product. More particularly, the computer program product is a product as follow: a product having a computer readable medium encoded with computer program logic thereon, when being executed on a computing equipment, the computer program logic provides related operations to implement the technical solution of the prevent invention. When being executed on at least one processor of a computing system, the computer program logic enables the processor to execute the operations (methods) described in the embodiments of the present invention. Such setting of the present invention is typically provided as software, codes and/or other data structures provided or encoded on the computer readable medium, e.g., an optical medium (e.g., Compact Disc Read Only Memory (CD-ROM)), a flexible disk or a hard disk and the like, or other media such as firmware or micro codes on one or more Read Only Memory (ROM) or Random Access Memory (RAM) or Programmable Read Only Memory (PROM) chips, or a downloadable software image, a shared database and the like in one or more modules. The software or the firmware or such configuration can be installed on the computing equipment, so that one or more processors in the computing equipment execute the technical solution described in the embodiments of the present invention.

Although the present invention is already illustrated above in conjunction with the preferred embodiments of the present invention, those skilled in the art should understand that, without departing from the spirit and scope of the present invention, various modifications, replacements and changes can be made to the present invention. Therefore, the present invention should not be defined by the above embodiments, but should be defined by the appended claims and equivalents thereof.

The invention claimed is:

1. An eNB comprising:
a configuration circuit configured to configure a configuration for a first physical uplink control channel (PUCCH), wherein the configuration includes a start physical resource block (PRB) and number of contiguous PRBs in a frequency domain in a time slot for the first PUCCH in RRC signaling, and a second PUCCH (Format 3),
wherein the second PUCCH occupies one PRB in a time slot, and
wherein three bits are used for indicating the number of contiguous PRBs.

2. The eNB according to claim 1, wherein frequency hopping between slots is applied to the configured first PUCCH.

3. A method executed by an eNB, comprising:
configuring a configuration for a first physical uplink control channel (PUCCH), wherein the configuration includes a start physical resource block (PRB) and number of contiguous PRBs in a frequency domain in a time slot for the first PUCCH in RRC signaling, and a second PUCCH (Format 3), wherein the second PUCCH occupies one PRB in a time slot, and
wherein three bits are used for indicating the number of the contiguous PRBs.

4. The method according to claim 3, wherein frequency hopping between slots is applied to the configured first PUCCH.

5. A UE, comprising:
a receiving circuit configured to receive a configuration for a first physical uplink control channel (PUCCH), wherein the configuration includes a start physical resource block (PRB) and number of contiguous PRBs in a frequency domain in a time slot for the first PUCCH in RRC signaling, and a second PUCCH (Format 3), wherein the second PUCCH occupies one PRB in a time slot, and
a sending circuit configured to send the configured first PUCCH and second PUCCH, wherein three bits are used for indicating the number of the contiguous PRBs.

6. The UE according to claim 5, wherein frequency hopping between slots is applied to the configured first PUCCH.

7. A method executed by a UE, comprising:
receiving a configuration for a first physical uplink control channel (PUCCH), wherein the configuration includes a start physical resource block (PRB) and number of contiguous PRBs in a frequency domain in a time slot for the first PUCCH in RRC signaling, and a second PUCCH (Format 3), wherein the second PUCCH occupies one PRB in a time slot, and sending the configured first PUCCH and second PUCCH, wherein three bits are used for indicating the number of the contiguous PRBs.

8. The method according to claim 7, wherein frequency hopping between slots is applied to the configured first PUCCH.

* * * * *